(No Model.)

J. H. SMITH.
CAR WHEEL AND AXLE.

No. 390,811. Patented Oct. 9, 1888.

WITNESSES:
Phil. C. Dieterich.
C. Sedgwick.

INVENTOR:
J. H. Smith
BY Munn & Co.
ATTORNEYS.

UNITED STATES PATENT OFFICE.

JOHN H. SMITH, OF PATERSON, NEW JERSEY.

CAR WHEEL AND AXLE.

SPECIFICATION forming part of Letters Patent No. 390,811, dated October 9, 1888.

Application filed June 15, 1888. Serial No. 277,210. (No model.)

*To all whom it may concern:*

Be it known that I, JOHN H. SMITH, of Paterson, in the county of Passaic and State of New Jersey, have invented certain new and useful Improvements in Car Wheels and Axles, of which the following is a full, clear, and exact description.

My invention relates to an improvement in car-wheels and axles therefor, and has for its object to provide a means whereby one wheel will run independent of the other, producing less friction upon curves and preventing all strain upon the axle; and the further object of my invention is to provide an axle and attached wheels of simple, durable, and economical construction.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
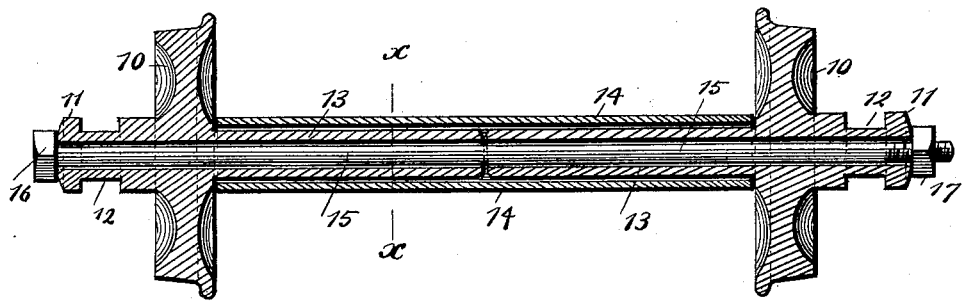
Figure 2:
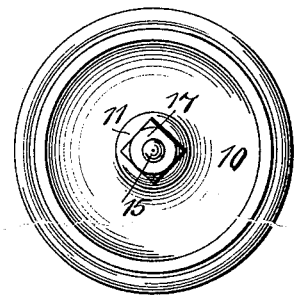
Figure 3:
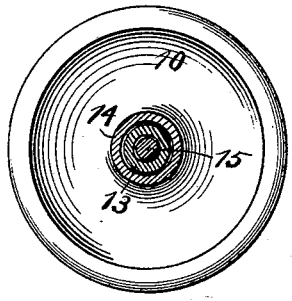

Figure 1 is a longitudinal section through the wheels and axle. Fig. 2 is a side elevation of the same, and Fig. 3 is a transverse section on the line $x\,x$ of Fig. 1.

In carrying out the invention the wheels 10 have cast integral therewith an outer tubular hub, 11, provided with an annular groove, 12, as best shown in Fig. 1. A sleeve, 13, is cast integral with the inner face of the wheel, which sleeves are of such length that when the opposing wheels are placed upon the track the contiguous ends of the said sleeves will abut, or essentially so, as shown in Fig. 1.

In forming the axle or in uniting the wheels an outer sleeve, 14, is made to cover the sleeves 13 of the wheels, the said outer sleeve being of sufficient length to extend from the inside of one wheel to the inner face of the other. The sleeve 14 is preferably made to turn loosely upon the wheel-sleeves 13. The outer sleeve having been placed in position, a rod, 15, is passed through the hubs and sleeves of the wheels, the ends of which rod are adapted to project beyond the said hubs. Upon one extremity of the rod 15 a cap or head, 16, is formed, and upon the opposite extremity a nut or equivalent fastening device, 17, is secured to a bearing against the hub; or, if it be found desirable, the rod may be threaded at both extremities and provided with the usual lock-nuts.

While I have described and illustrated specific construction, I desire it to be distinctly understood that equivalent construction may be employed without departing from the spirit of the invention. As, for instance, the sleeves 13, which are shown as formed integral with the wheel, may be attached thereto if such construction be found desirable.

The groove-section 12 of the hub is adapted to enter and be journaled in any suitable form of hanger. It will be observed from the construction above set forth that the wheels and axle may not only be expeditiously put together, but that, each turning independent of the other, there is less friction or wear in use.

Having thus described my invention, what I claim as new, and desire to secure by Letters Patent, is—

1. The combination, with wheels provided with a sleeve extending from the inner face and a hub formed upon the outer face, provided with an annular groove adapted to constitute the bearing for said wheels, of an outer sleeve loosely mounted upon the wheel-sleeves, and a rod passing through said hubs and wheel-sleeves, substantially as and for the purpose specified.

2. The combination, with wheels having a sleeve extending from the inner face, which sleeves are adapted to abut, and a hub formed upon the outer face having an annular groove produced therein, which groove constitutes the bearing for the wheel, of an outer sleeve loosely mounted upon the wheel-sleeves, extending from wheel to wheel, a rod passing through the said hub, the wheels and the wheel-sleeves, and nuts secured upon the extremities of said rod, substantially as and for the purpose specified.

JOHN H. SMITH.

Witnesses:
MICHAEL DELANY,
JOHN KEYS, Jr.